United States Patent
Knaappila

(10) Patent No.: US 9,967,722 B2
(45) Date of Patent: May 8, 2018

(54) PACKET TRANSMISSION TIMING PARAMETER DISCOVERY FOR WIRELESS COMMUNICATION SYNCHRONIZATION

(71) Applicant: Silicon Laboratories Finland Oy, Espoo (FI)

(72) Inventor: Jere M. Knaappila, Evitskog (FI)

(73) Assignee: Silicon Laboratories Finland OY, Espoo (FI)

( * ) Notice: Subject to any disclaimer, the term of this patent is extended or adjusted under 35 U.S.C. 154(b) by 173 days.

(21) Appl. No.: 15/197,166

(22) Filed: Jun. 29, 2016

(65) Prior Publication Data

US 2018/0007523 A1    Jan. 4, 2018

(51) Int. Cl.
| | |
|---|---|
| *H04W 4/21* | (2018.01) |
| *H04W 4/80* | (2018.01) |
| *H04W 8/00* | (2009.01) |
| *H04W 4/20* | (2018.01) |
| *H04W 4/00* | (2018.01) |

(52) U.S. Cl.
CPC ............ *H04W 4/21* (2018.02); *H04W 4/008* (2013.01); *H04W 4/206* (2013.01); *H04W 4/80* (2018.02); *H04W 8/005* (2013.01)

(58) Field of Classification Search
CPC ......... H04W 4/21; H04W 4/80; H04W 8/005; H04W 4/008; H04W 4/206
See application file for complete search history.

(56) References Cited

U.S. PATENT DOCUMENTS

| | | | |
|---|---|---|---|
| 8,478,266 B1* | 7/2013 | Zhou | H04W 60/00 380/232 |
| 2007/0211681 A1* | 9/2007 | Sun | H04L 45/04 370/338 |
| 2007/0255662 A1* | 11/2007 | Tumminaro | G06Q 20/027 705/79 |
| 2009/0119190 A1* | 5/2009 | Realini | G06Q 20/04 705/30 |
| 2011/0021142 A1 | 1/2011 | Desai et al. | |
| 2012/0327920 A1 | 12/2012 | Xhafa et al. | |

(Continued)

OTHER PUBLICATIONS

Bluetooth, "Specification of the Bluetooth System" Version 4.2, vol. 6 Part B: Title page and pp. 1-3; Table of Contents (pp. 26-29); Section 4.4.3 "Scanning State" (pp. 73-75); Dec. 2, 2014, 11 pgs.

*Primary Examiner* — Walter J Divito
(74) *Attorney, Agent, or Firm* — Egan Peterman Enders Huston

(57) ABSTRACT

Systems and methods are provided that allow a BLE scanning device or other receiving device to use packet transmission timing parameter discovery to synchronize its listening times to the actual packet transmission times from a transmitting device such as a BLE advertising device. Once discovered, the packet transmission timing parameter/s may be used by the receiving device to calculate the same pseudorandom delay time component (such as BLE advDelay) that is being used by the transmitting device to determine intervals between the transmitted packets. This allows the receiving device to calculate the exact time that the transmitting device is transmitting each packet, so that the receiving device may synchronize its listening times to coincide with the packet transmitting intervals used by the transmitting device.

21 Claims, 7 Drawing Sheets

(56) References Cited

U.S. PATENT DOCUMENTS

| | | |
|---|---|---|
| 2013/0003715 A1 | 1/2013 | Xhafa et al. |
| 2013/0090061 A1 | 4/2013 | Linde |
| 2013/0235166 A1 | 9/2013 | Jones et al. |
| 2014/0321321 A1 | 10/2014 | Knaappila |
| 2015/0271628 A1 | 9/2015 | Knaappila |
| 2015/0319600 A1 | 11/2015 | Knaappila |
| 2016/0026829 A1* | 1/2016 | Brocker .................. G06F 21/87 726/34 |
| 2016/0381596 A1* | 12/2016 | Hu ....................... H04B 7/0617 370/236 |
| 2017/0061138 A1* | 3/2017 | Lambert ................. H04L 63/18 |

* cited by examiner

PACKET TRANSMISSION TIMING PARAMETER DISCOVERY FOR WIRELESS COMMUNICATION SYNCHRONIZATION

FIELD

The disclosed systems and methods relate to wireless communication and, more particularly, to advertisement packet transmission and reception for wireless communication.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new application utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudorandom intervals, pass advertisement packets which the master device (also known as scanner device, i.e., "scanner") is scanning. Depending on the type of advertisement packet sent by a slave device, the master device may respond to the received advertisement packet by requesting a connection with the slave device, or may respond by requesting further information from the advertising device.

The BLE specification (Bluetooth Specification Versions 4.0, 4.1, 4.2) requires that individual BLE advertisement packets be transmitted periodically from a BLE advertising device in advertising mode at T_advEvent intervals. T_advEvent consists of two components, advInterval which is a fixed time value, and advDelay which is a pseudorandom delay time for adding pseudorandom jitter of from 0 to 10 milliseconds. Conventional devices scanning for transmitted advertisements packets do not know what pseudorandom delay time value (advDelay) is being added to the regular time interval value (advInterval) for any given packet. Therefore, after receiving an advertisement packet, a conventional scanning device must scan continuously to receive the next advertisement packet, which consumes large amounts of power.

SUMMARY

Disclosed herein are systems and methods that may be implemented to allow a BLE scanning device or other receiving device to use packet transmission timing parameter discovery to synchronize its listening times to the actual packet transmission times from a transmitting device such as a BLE advertising device. For example, a receiving device may determine packet transmission timing components that include a fixed time component and/or a pseudorandom delay time component of the overall time interval between packet transmission times from a transmitting device. In one embodiment, the disclosed systems and methods may be so implemented to allow a receiving device to discover one or more packet transmission timing parameter/s (e.g., such as pseudorandom number generation seed value and/or fixed advInterval time value) from the timing of multiple packets transmitted from a transmitting device. Once discovered, the packet transmission timing parameter/s may be used by the receiving device to calculate the same pseudorandom delay time component (such as BLE advDelay) that is being used by the transmitting device to determine intervals between the transmitted packets. This allows the receiving device to calculate the exact time that the transmitting device is transmitting each packet, so that the receiving device may synchronize its listening times to coincide with the packet transmitting intervals used by the transmitting device. In this way, the receiving device may save power by reducing the length of the listening window required to ensure reception of the transmitted packets, and does not have to scan or listen continuously.

In one embodiment of the disclosed systems and methods, a transmitting device does not directly transmit a seed value to the receiving device. Rather, the receiving device may passively discover the seed value from the timing of the packets sent by the transmitting device. Advantageously, passive discovery of seed value may further reduce listening device power consumption (e.g., dropping power consumption down to about 0.1% of full scanning power for a BLE scanning device). Further, processing time and bandwidth may be conserved because no transmission protocol is required to directly transmit a seed value from the transmitting device to the receiving device, nor is a connection required to be formed between the devices to share the seed value.

In one exemplary embodiment, a transmitting device may be provided with a pseudorandom number algorithm and generator that is suitable for generating pseudorandom timing for packet transmissions that is indicative of one or more packet transmission timing parameters utilized to generate the pseudorandom packet transmit times, and so that a receiving device may resolve one or more of the packet transmission timing parameters (e.g., such as advInterval, pseudorandom generator algorithm and seed values, timebase used by advertising device) from the timing of the received packets.

In another exemplary embodiment, it is possible that one or more packet transmission timing parameters may be distributed beforehand to the receiving device to simplify random number state discovery. For example, in one exemplary embodiment, a pseudorandom number generation algorithm may be shared or otherwise known beforehand by both receiving (e.g., scanning) and transmitting (e.g., advertising) devices. A receiving device may then receive multiple packets from the transmitting device. With knowledge of the pseudorandom algorithm, the receiving device may then solve for the value of the seed used by transmitting device after it has received a sufficient number of packets from the transmitting device, but without yet forming a connection with the transmitting device. After the receiving device has discovered the seed value, the receiving device may use the discovered seed value and pseudorandom number generation algorithm to predict when the transmitting device will send the next packet and listen for the packet at only at that predicted time, e.g., using BLE low power scanning protocol. In a further embodiment, the transmitting device may update the seed value at the occurrence of every advertisement event, and the receiving device may synchronize its timer to the received advertisements. Other examples of packet transmission timing parameters that may be distributed beforehand to the receiving device include, but are not limited to, advInterval time value, pseudorandom number generation seed value, timebase used by advertising device, etc.

In yet a further embodiment, a central (scanning) device may keep track of advertising devices and seed value pairs it is interested in. An advertising device may use the seed value to calculate a random offset for advertising events, which the scanning device may discover and update to keep track of the advertising device timing.

In one respect, disclosed herein is a method of operating a radio apparatus, including: wirelessly receiving multiple transmitted packets in the radio apparatus, each of the multiple packets being received at a time interval from a previous received packet that is based at least in part on a pseudorandom number generated from one or more packet transmission timing parameters; measuring one or more of the time intervals, each of the time intervals being measured between receipt of a pair of the multiple received packets; using the measured time intervals to discover one or more of the packet transmission timing parameters; calculating a pseudorandom number using the discovered packet transmission timing parameters and using the calculated pseudorandom number to determine a listening time for a future transmitted packet; and listening for a future transmitted packet at the determined listening time.

In another respect, disclosed herein is an apparatus, including at least one at least one processor or programmable logic device (PLD) coupled to memory and configured to be coupled to an antenna. The processor or PLD may be programmed to: wirelessly receive multiple transmitted packets, each of the multiple packets being received at a time interval from a previous received packet that is based at least in part on a pseudorandom number generated from one or more packet transmission timing parameters; measure one or more of the time intervals, each of the time intervals being measured between receipt of a pair of the multiple received packets; use the measured time intervals to discover one or more of the packet transmission timing parameters; calculate a pseudorandom number using the discovered packet transmission timing parameters and using the calculated pseudorandom number to determine a listening time for a future transmitted packet; and listen for a future transmitted packet at the determined listening time.

In another respect, disclosed herein is a method, including: wirelessly transmitting multiple transmitted packets from a first radio apparatus, each of the multiple packets being transmitted at a time interval from a previous transmitted packet that is based at least in part on a pseudorandom number generated from one or more packet transmission timing parameters; wirelessly receiving the multiple transmitted packets in a second radio apparatus; measuring one or more of the time intervals in the second radio apparatus, each of the time intervals being measured between receipt of a pair of the multiple received packets; using the measured time intervals to discover one or more of the packet transmission timing parameters; calculating the pseudorandom number using the discovered packet transmission timing parameters and using the calculated pseudorandom number to determine a listening time for an additional transmitted packet; wirelessly transmitting the additional packet from the first radio apparatus; and listening for the additional transmitted packet in the second radio apparatus at the determined listening time.

DESCRIPTION OF ILLUSTRATIVE EMBODIMENTS

Figure 1:
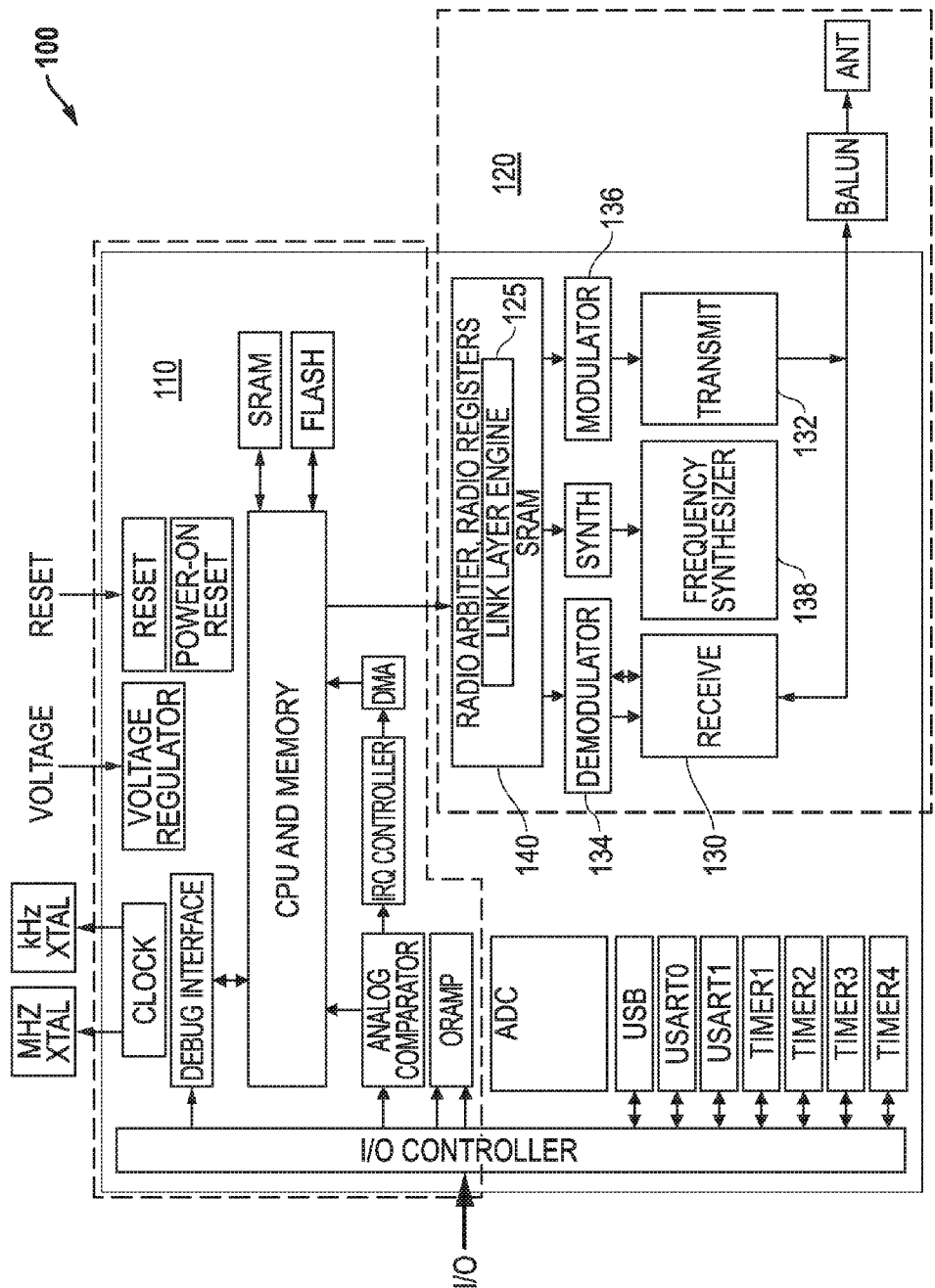
FIG. 1 illustrates a simplified block diagram of a Bluetooth module according to one exemplary embodiment of the disclosed systems and methods.

FIG. 1 illustrates a simplified block diagram of an example radio apparatus configured in the form of a BLE radio module 100 that may be employed in one exemplary embodiment as a BLE device to implement the disclosed systems and methods. Although examples are described herein relating to BLE devices in communication using BLE protocol, it will be understood that similar methodology for discovering pseudorandom transmission time for packets may be employed for any other type of RE communication technology and/or radio module hardware and software/firmware configuration that employs pseudorandom number generation to determine timing for transmitted packets.

As shown in FIG. 1, BLE module 100 includes a first module segment 110 that includes one or more central processing units (CPUs), processors or other processing devices and memory with application data. A second module segment 120 is configured to implement a part of a link layer and physical layer for radio module 100, and includes components such as radio arbiter and registers 140, link layer engine 125, modulator 136 and demodulator 134, receiver 130 and transmitter 132, frequency synthesizer 138, balancing-unbalancing unit ("balun"), antenna ("ant"). Second module 120 also may include mixer/s, amplifier/s, filter/s and other radio circuitry suitable for respective radio transmission and reception operations. In one embodiment, second module segment 120 may include memory and one or more microcontrollers, processors or other processing devices programmed or otherwise configured to execute one or more components of module segment 120, e.g., such as link layer engine 125. In one embodiment the one or more processing devices, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by processing devices of BLE module 100, enable the BLE module 100 to operate as a BLE device to perform the functions described herein. Memory of BLE module 100 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to an antenna as shown. Second module segment 120 may include a radio that includes baseband processing, MAC (media access control) level processing, and/or other physical layer processing for BLE packet communications. The processing devices of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a wall outlet.

CPU/s of first module segment 110 may be employed to implement a host layer and an application layer that includes apparatus-related application/s (e.g., heart rate, proximity, blood pressure, time update, temperature, battery, etc.), smart profiles, and script and application programming interface (API). Such an application layer may be capable of reading sensor data (e.g., from heart rate sensor, etc.), and reporting the data to the host layer for transmission using Bluetooth (or BLE) controller of second module segment 120. Link layer engine 125 may be employed to implement a link layer that is present to provide ultra-low power idle mode operation and device discovery (i.e., connection mode and advertising mode handling). Link layer is also configured to control scanning, packet transmission and response. Further information on BLE radio modules and components and layers thereof may be found, for example, in United States Patent Application Publication No. 2014/0321321; United States Patent Application Publication No. 2015/0319600; and United States Patent Application Publication No. 20150271628, each of which is incorporated herein by reference in its entirety for all purposes.

In BLE technology, one or more so called slave devices may be connected to a master device. The master may be configured to communicate with one or more slave devices—also simultaneously. To let the master know about the slave devices, the slave devices (or at that point "advertisers") may periodically, at pseudo-random intervals, pass advertisement packets which a master device (also known as scanner device, i.e. "scanner") is scanning.

Example advertisement packet types that may be transmitted from a slave device include:

| | |
|---|---|
| ADV_IND | connectable and scannable undirected advertising event |
| ADV_DIRECT_IND | connectable directed advertising event |
| ADV_NONCONN_IND | non-connectable or non-scannable undirected advertising event |
| ADV_SCAN_IND | scannable undirected (non-connectable) advertising event. |

Example types of response packets that may be transmitted by a scanning device in response to received advertisement packets of the advertising device include:

| | |
|---|---|
| SCAN_REQ | scan request for further information from advertiser |
| CONNECT_REQ | connect request. |

If the advertiser sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange keys or other encryption info to be stored for future connections.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices.

The state for passing advertising packets is called "advertising state" and the state for connection is called "connected state". In both states, data transfer occurs. A slave device may be a sensor or an actuator, such as a temperature sensor, heart rate sensor, light bulb, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 20150271628, each of which has been incorporated herein by reference in its entirety for all purposes.

Figure 2:
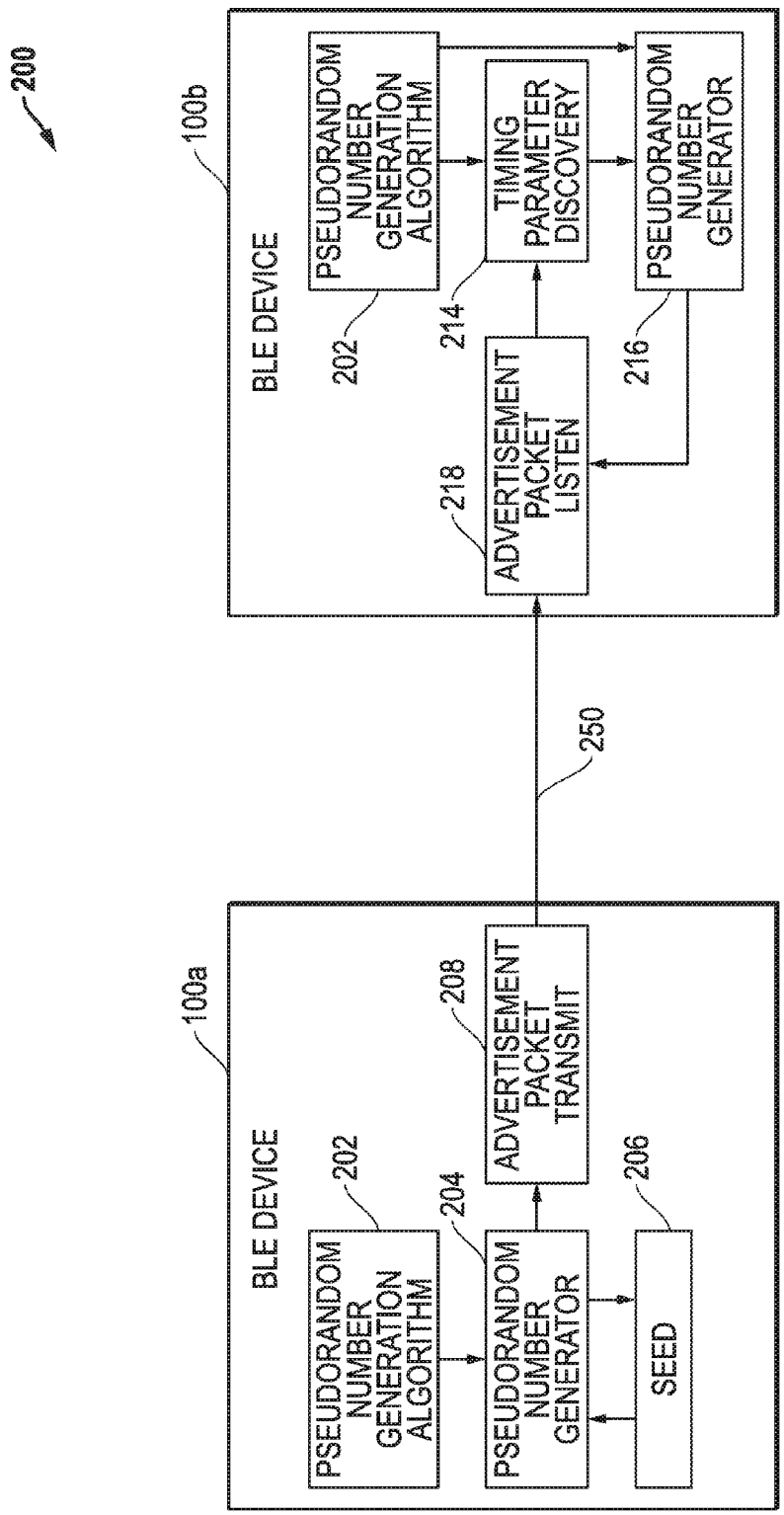
FIG. 2 illustrates a radio frequency (RF) communications environment according to one exemplary embodiment of the disclosed systems and methods.

FIG. 2 illustrates one exemplary embodiment of radio frequency (RF) communications environment 200 that includes a transmitting device (in this case a BLE advertising device 100a) that is in wireless communication with a receiving device (in this case a BLE scanning device 100b). In one embodiment, each of BLE devices 100a and 100b may include a link layer engine 125 implementing a link layer for controlling transmission and reception of packets, respectively, as described and illustrated in relation to FIG. 1. As shown in FIG. 2, advertising device 100a is using its link layer to control transmission of advertisement packets 250 that are being received by link layer of scanning device 100b, and link layer of advertising device 100a uses packet transmission timing parameters to control advertisement packet transmission timing. For example, link layer of advertising device 100a includes a pseudorandom number generator 204 that implements a pseudorandom number generation algorithm 202 together with a seed value 206 to control advertisement packet transmit 208, and to produce a new seed value 206 with each transmission of an advertisement packet 250. Each new seed value 206 is used for by pseudorandom number generator 204 to control transmission of the next advertisement packet 250.

Still referring to FIG. 2, a link layer of scanning device 100b uses packet transmission timing parameters to scan for and control reception of advertisement packets 250. As shown, link layer of scanning device 100b includes a pseudorandom number generator 216 that implements the same pseudorandom number generation algorithm 202 used by device 100a together with a discovered seed value 214 to control advertisement packet listen 218. In this regard, scanning device 100b uses pseudorandom algorithm 202 to discover the next seed value 214 of a received advertisement packet 250 based on the timing pattern of multiple previously received advertisement packets 250. The discovered next seed 214 is then used together with pseudorandom algorithm 202 by pseudorandom number generator 216 to determine the transmission time of the next advertisement packet 250 from advertising device 100a, which is used by scanning device 100b as the start time for a listening window for the next advertisement packet 250. During the determined listening window interval, scanning device 100b places its radio receiver components of module segment 120 in powered active listening mode. In one embodiment, scanning device 100b may discover a first seed value 214, and then use its pseudorandom number generator 216 to independently determine transmission times (as well as listening windows) for additional following advertisement packets 250 that are transmitted from advertising device 100a in a manner that is independent and in parallel to the operation of the of the pseudorandom number generator 204 of the advertising device 100a, e.g., as illustrated and described in relation to FIG. 3.

Still referring to FIG. 2, scanning device 100b may synchronize its listening intervals to coincide with the advertising packet transmitting intervals of advertising device 100a. This allows scanning device 100b to place one or more of its radio receiver components of module segment 120 (e.g., receiver 130, demodulator 134 as well as associated mixer/s, amplifier/s and filter/s of the radio receive circuitry path) in a reduced or relatively lower power consumption mode (e.g., low power or non-powered mode) after reception of a given advertisement packet 250 and until the occurrence of the actual time for transmission of the next advertisement packet 250. During the relatively lower power consumption mode the radio receiver components of the RF receive path do not process received. RF signals, thus saving power. It will be understood that the pseudorandom number generation algorithm 202 may be shared between or otherwise provided to both scanning device 100a and 100b in any suitable manner, e.g., such as previously stored beforehand during assembly or device fabrication/programming in non-volatile memory of each device, wirelessly transmitted beforehand from either of device 100a or 100b to the other device, wirelessly transmitted beforehand to each device from another central BLE device, etc.

Figure 3:
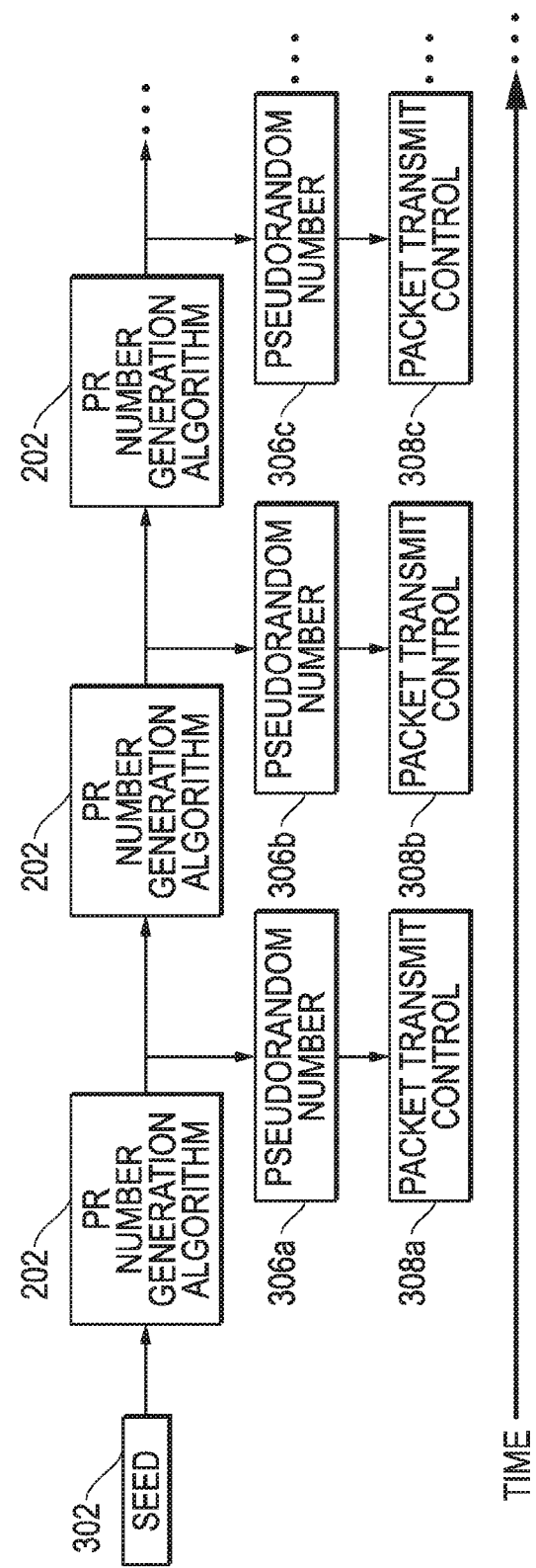
FIG. 3 illustrates operation of a pseudorandom generator over time according to one exemplary embodiment of the disclosed systems and methods.

FIG. 3 illustrates one exemplary embodiment for operation of a pseudorandom generator over time, such as may be employed for pseudorandom number generator 204 and 216 of FIG. 2. As shown, a seed value 302 is provided as input at time a to a pseudorandom number generation algorithm 202, which calculates a corresponding pseudorandom number 306a. As shown, the calculated pseudorandom number 306a is used both to control advertisement packet transmit time 308a and is used as the seed value that is input to pseudorandom number generation algorithm 202, which then calculates a subsequent and different pseudorandom number 306b that is used to control transmit time 308b for the next advertisement packet 250 as well as a seed value that is input to pseudorandom number generation algorithm 202 to create a subsequent and different pseudorandom number 306c that is used to control transmit time 308c for the next advertisement packet 250, and so on in similar fashion. In this embodiment, operation of the pseudorandom number generator is deterministic such that the output of the pseudorandom number generation algorithm 202 is only dependent on the input to the pseudorandom number generation algorithm 202.

Figure 4:
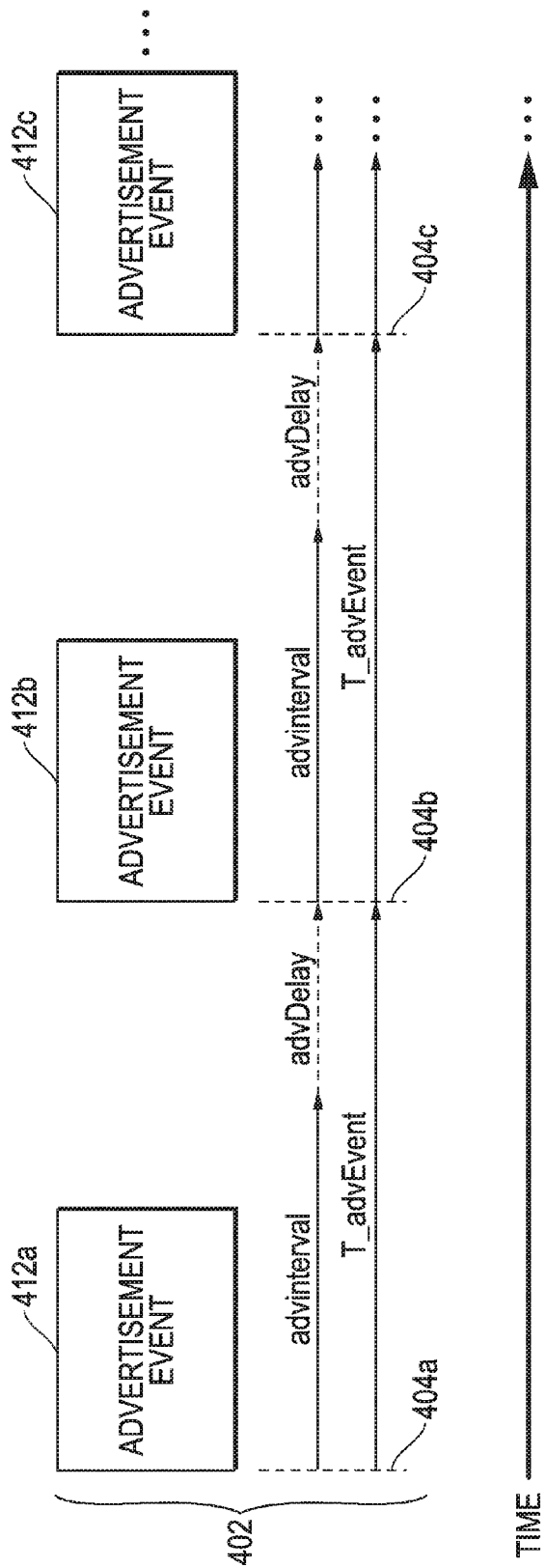
FIG. 4 illustrates a pattern of sequential advertising events according to one exemplary embodiment of the disclosed systems and methods.

FIG. 4 illustrates a pattern 402 of sequential advertising events (412a, 412b, 412c, etc.), as they may occur, for example, according to the embodiment of FIGS. 2 and 3 and the BLE specification (e.g., Bluetooth Specification Versions 4.0, 4.1, 4.2). A respective advertisement packet 250 is transmitted during each advertising event 412. As shown, each advertisement event 412 begins at the end of a corresponding T_advEvent time interval 404 that is determined in part by advertisement packet transmit 208 according to the current pseudorandom number generated by pseudorandom number generator 204 of FIG. 2. As shown, each T_advEvent interval consists of two components, advInterval which is a predetermined fixed time value, and advDelay which is a pseudorandom delay time of from 0 to 10 milliseconds that is calculated for each advertising event based on the current pseudorandom number generated by pseudorandom number generator 204. Because each advDelay is a different pseudorandom time dependent on the pseudorandom number generated by pseudorandom number generator 204, the value of the T_advEvent time interval between start of advertising event 404a and advertising event 404b is different from the value of the T_advEvent time interval between start of advertising event 404b and advertising event 404c, etc.

Figure 5:
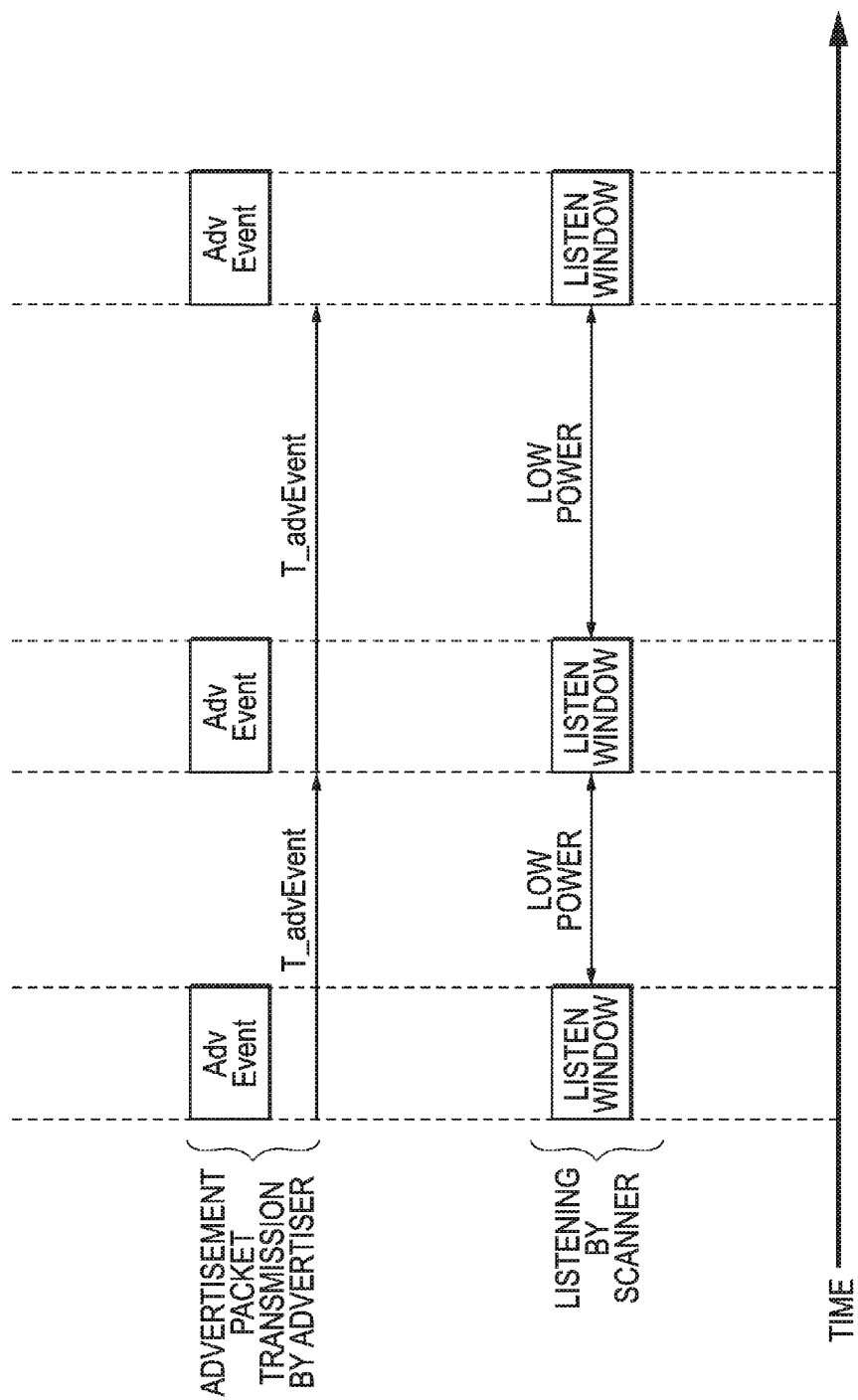
FIG. 5 illustrates a scanning device using packet transmission timing parameter discovery to synchronize the timing and duration of its listening times to coincide with timing and duration of corresponding advertising events according to one exemplary embodiment of the disclosed systems and methods.

FIG. 5 illustrates how scanning device 100b uses timing parameter discovery 214 and pseudorandom number generator 216 to control advertisement packet listen 218 so as to synchronize the timing and duration of its higher power consumption listening times to coincide with timing and duration of corresponding advertising events, while remaining in reduced or relatively lower power consumption mode during the time intervals between the advertising events. During each of the intermittent listening windows, scanning device 100b places one or more of its radio receiver components of the RF receive path of module segment 120 (e.g., receiver 130 demodulator 134 as well as associated mixer/s, amplifier/s and filter/s of the radio receive circuitry path) into a relatively higher power consumption mode during which the radio receiver components consume relatively more power than it does during the relatively lower power consumption mode in order to receive and process incoming RF signals that include a respective given advertisement packet 250. Between the intermittent listening windows, the scanning device 100b again places its radio receiver components of module segment 120 into the relatively lower power consumption mode during which the radio receiver components do not process incoming RE signals, thus consuming relatively less power than the scanning device 100b consumes during the relatively higher power consumption mode.

As an example only, the following pseudorandom generation algorithm 202 and set of relationships is shared beforehand between an advertising device 100a and a scanning device 100b. In this example, "X" and advInterval are fixed packet transmission timing control values that are initially known only by the advertising device, with "X" being a fixed integer value that is less than 10. It will be understood that the following pseudorandom generation algorithm 202 is exemplary only, and that any other algorithm (including more complicated algorithms) may be employed that is suitable for discovery (e.g., together with a seed value) from the timing of received advertisement packets 250.

Next Seed Value=remainder of (Previous Seed Value+X)/10; where

Next advDelay=Next Seed Value; and

Next T_advEvent=advInterval+Next advDelay.

(In this embodiment, Seed Value stays within 0-10 values)

Table 1 illustrates a sample set of timing data determined by the scanning device 100b from seven advertisement packets 250 numbered 0 to 6 that are sequentially received in continuous listening mode at the scanning device 100b from the advertising device 100a. In Table 1, packet 0 is the first packet received for which the previous T_advEvent is unknown, and packet 1 is the second received packet 250 for which T_advEvent may be determined based on time interval from receipt of the previous packet 0. In this exemplary embodiment, scanning device 100b is programmed to continuously listen for new advertisement packets 250 until the determined T_advEvent values repeat, i.e., which occurs in this case when T_advEvent=104 repeats upon receipt of packet number 6.

TABLE 1

Received Packet Data

| Received Packet Number | Determined T_advEvent from Previous Received Packet (milliseconds) |
|---|---|
| 0 | N/A |
| 1 | 104 |
| 2 | 106 |
| 3 | 108 |
| 4 | 100 |
| 5 | 102 |
| 6 | 104 |

From the collected data of Table 1, scanning device 100b is programmed to use timing parameter discovery 214 to discover advInterval from the minimum determined received T_advEvent value in the collected data set of Table 1, which in this example is 100 milliseconds as shown.

Table 2 illustrates the data of Table 1, together with seed values determined by timing parameter discovery 214 of scanning device 100b for each received packet given that the discovered advInterval is 100 milliseconds and given the predefined relationship that (Current advDelay=Next Seed Value−Current T_advEvent−advInterval). As shown by the data of Table 2, scanning device 100b is also programmed to determine that the change "X" in seed value is +2 from the previous seed value for each T_advEvent iteration given the known random number generator relationship (Next Seed Value=Previous Seed Value+X). Thus, in this embodiment, after collecting one cycle of advertisement packets 0 to 6 using continuous listening mode, scanning device 100b is programmed to determine that the next seed value (and next advDelay) for the transmission of the next advertisement packet number 7 by adding the determined "X" value of 2 to the previous seed value of 4, i.e., Next Seed Value=Previous Seed Value+2=6. In this embodiment, scanning device 100b is also programmed to determine that the Next T_advEvent=advInterval+Next advDelay=100+6=106. Thus, scanning device 100b now knows that the next advertisement packet 250 will be sent at the next T_advEvent of 106 milliseconds from the previous advertisement packet 250, and is programmed to switch to relatively lower power consumption mode (e.g., low power or non-powered mode) until the occurrence of the actual time for transmission of the next advertisement packet 250, thus saving power. After receipt of each subsequent advertisement packet 250, scanning device 100b is programmed to continue to determine the next T_advEvent for transmission of the next advertisement packet 250 and transition from continuous listening mode to a selective listening mode that is synchronized to listen for the next advertisement packet 250 at its T_advEvent in similar manner as shown in FIG. 5.

TABLE 2

Discovered Seed Values

| Received Packet Number | Determined T_advEvent from Previous Received Packet (milliseconds) | Discovered Seed Value = (T_advEvent − advInterval) | Determined Change in Seed Value from Previous Seed Value |
|---|---|---|---|
| 0 | N/A | N/A | N/A |
| 1 | 104 | 4 | N/A |
| 2 | 106 | 6 | +2 |
| 3 | 108 | 8 | +2 |
| 4 | 100 | 0 | N/A |
| 5 | 102 | 2 | +2 |
| 6 | 104 | 4 | +2 |

Figure 6:
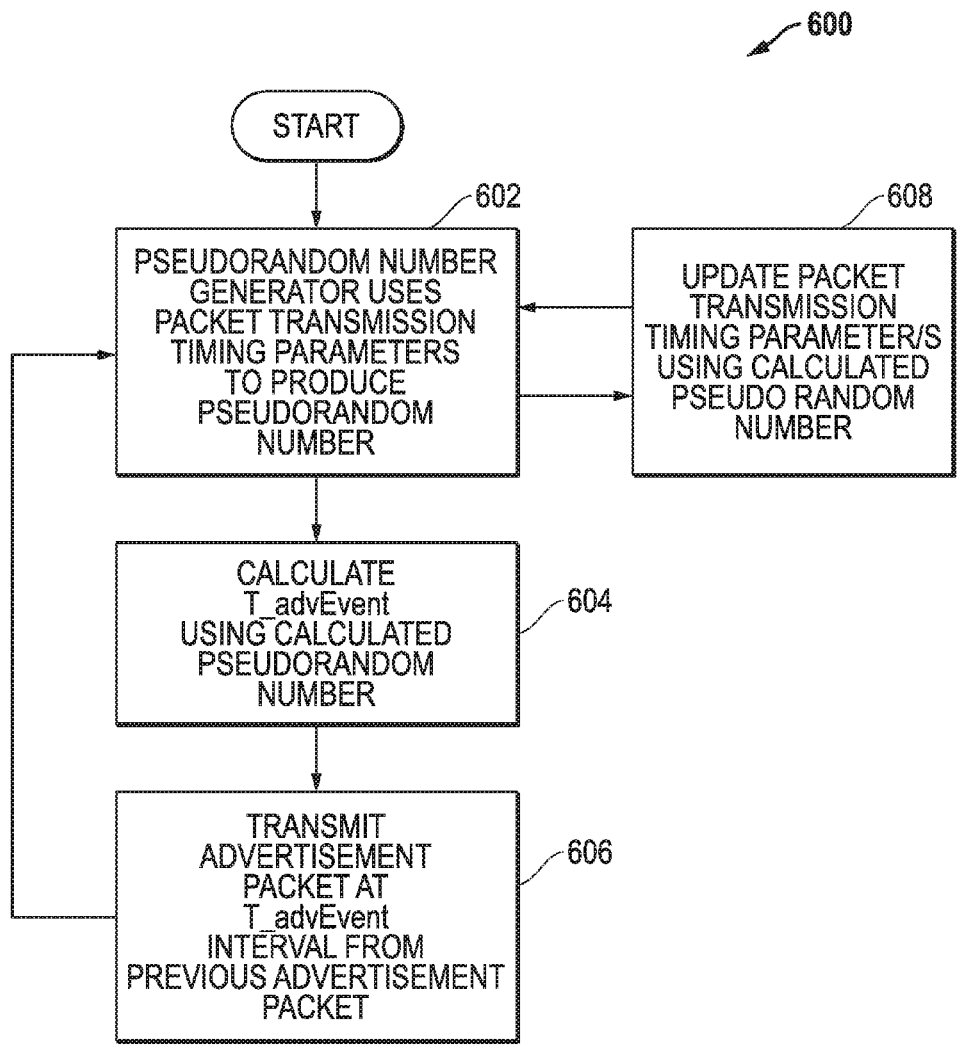
FIG. 6 illustrates methodology according to one exemplary embodiment of the disclosed systems and methods.

FIG. 6 illustrates one embodiment of methodology 600 that may be implemented by a link layer of an advertising device 100a to control transmission of advertisement packets 250. As shown, methodology 600 starts in step 602 where pseudorandom number generator 204 uses packet transmission timing parameter/s to produce a pseudorandom number, e.g., in this example to produce a pseudorandom number from an initial seed value 206 using pseudorandom number generation algorithm 202 that may be predefined and stored in non-volatile memory of advertiser device 100a. In this example, the initial seed value 206 may be, for example, a predetermined value (e.g., such as zero or other suitable value) that is also predefined and stored in non-volatile memory of advertiser device 100a and that is suitable for use by pseudorandom number generator 204 to produce an acceptable T_advEvent interval as further described. It will be understood that in other embodiments, initial packet transmission timing parameters employed by advertiser device 100a may be random, such as initial seed value 206 and/or a configuration of pseudorandom number generation algorithm 202 or pseudorandom number generator 204.

Still referring to FIG. 6, the seed value and/or any other applicable packet transmission timing parameter is then updated in step 608 using the calculated pseudorandom number for future use, and methodology 600 proceeds to step 604 where T_advEvent is calculated using the produced pseudorandom number from step 602. An advertisement packet 250 is then transmitted in step 606 at the calculated T_advEvent from step 604. In the initial case, the first T_advEvent may be measured from time of transmission of a previous first advertisement packet 250 that is initially transmitted at the start of methodology 600. Methodology 600 then returns to step 602 where pseudorandom number generator 204 uses pseudorandom number generation algorithm 202 to produce a new pseudorandom number from the applicable updated packet transmission control parameter/s (e.g., in this case from the update seed value 206 of the last iteration using pseudorandom number generation algorithm 202), and then repeats steps 604, 606 and 608 using the new pseudorandom number. Methodology 600 continues to repeat in similar manner to transmit subsequent advertisement packets 250.

Figure 7:
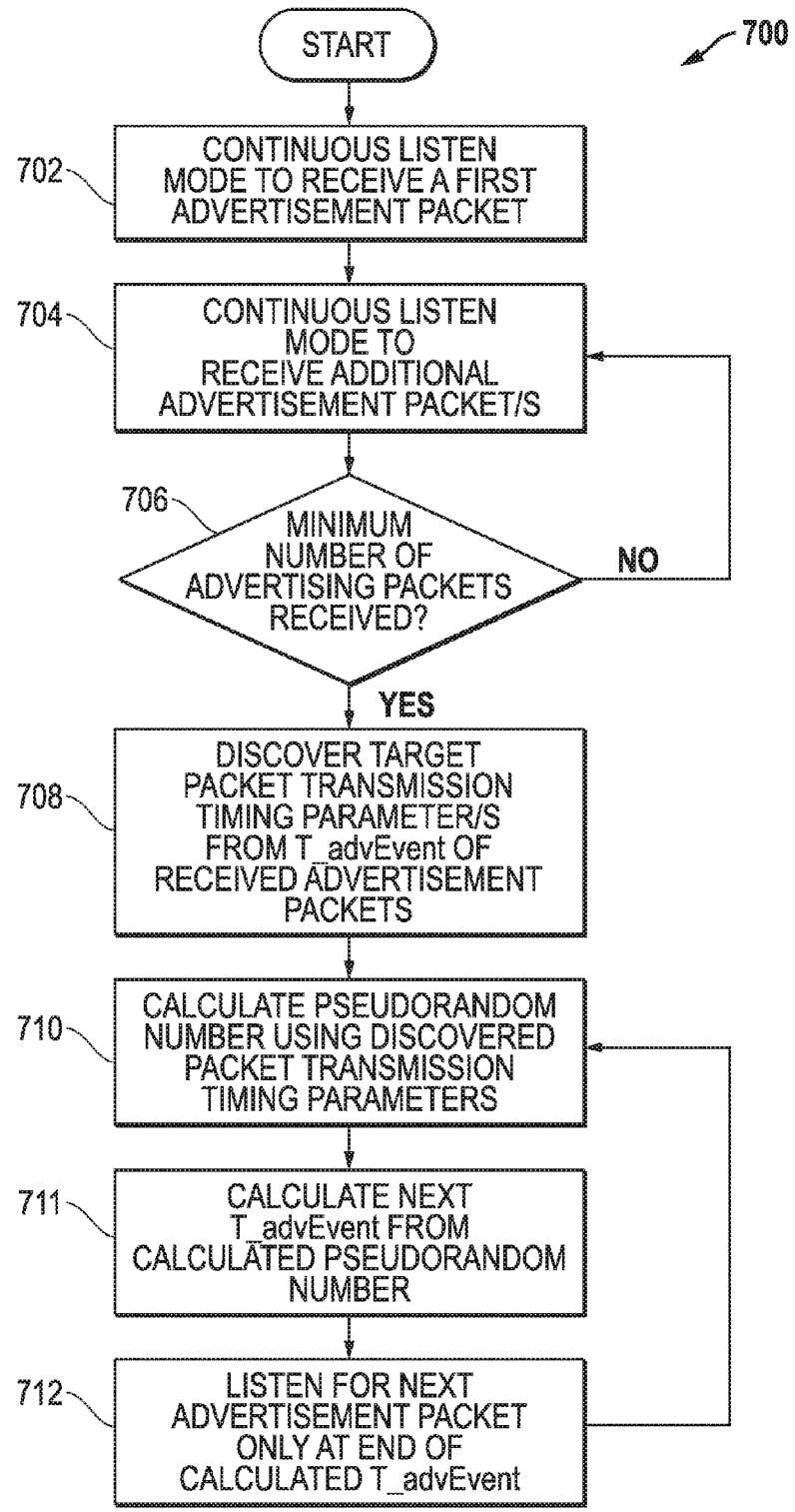
FIG. 7 illustrates methodology according to one exemplary embodiment of the disclosed systems and methods.

FIG. 7 illustrates one embodiment of methodology 700 that may be implemented by a link layer of a scanning device 100b to synchronize its listening times to packet transmission times from an advertisement device 100a. As shown, methodology 700 starts in steps 702 and 704 where scanning device 100b operates in a continuous listening mode in order to receive a first advertisement packet 250 and at least one additional advertisement packet 250. Scanning device remains in continuous listen mode until a sufficient number of multiple advertisement packets 250 have been received to allow the scanning device 100b to discover one or more target packet transmission timing parameters in the above example an advInterval value, "X" value and a seed value) from the timing of the received advertisement packets 250 in a manner as described elsewhere herein. When it is determined in step 706 that a sufficient number of advertisement packets 250 have been received to enable advInterval, "X" value, and seed value discovery, then methodology 700 proceeds on to step 708. In step 708, advInterval value, "X" value, and the next seed value to be used by advertisement device 100a to transmit the next advertisement packet 250 are discovered with knowledge of pseudorandom number generation algorithm 202 using a combination of one or more measured time intervals (T_advEvent) between the received advertisement packets 250.

Once advInterval, "X" value and the next seed value has been discovered in step 708, methodology 700 proceeds to step 710 where pseudorandom number generator 216 uses the discovered seed value to calculate a pseudorandom number that is then used in step 711 together with discovered advInterval to calculate the length of the next T_advEvent. Next, scanning device controls components of second module segment 120 to listen for the next advertisement packet 250 only after the passage of the calculated T_advEvent and only for the during the duration of the advertisement, e.g., in a manner as illustrated and described in relation to FIG. 5. Methodology 700 then may return to step 710 and repeat steps 710 to 712 as shown, using the discovered packet transmission timing parameters as input to pseudorandom number generator 216 in step 710 while updating the packet transmission timing parameters as needed (e.g., using the calculated pseudorandom number of the previous iteration of step 710 as a new seed value to calculate a new and different pseudorandom number for the current iteration of step 710), followed by recalculating T_advEvent in step 711 and listening in step 712 for each subsequent advertisement packet 250. In this way, packet transmission timing parameters including a first pseudorandom number generation seed value may be discovered in step 708 and then iteratively used in steps 710 to 712 by pseudorandom number generator 216 to determine subsequent listening times for multiple future advertisement packets 250, following or mirroring the operation of pseudorandom number generator 204 of advertising device 100a without repeating step 708 to discover a new seed value. Thus the calculated pseudorandom number of each iteration of step 710 may be used as an input value to pseudorandom number generation algorithm 202 to determine a new pseudorandom number and seed value in the manner illustrated and described in relation to FIG. 3.

It will be understood that methodology 600 of FIG. 6 and methodology 700 of FIG. 7 are exemplary only, and that any other combination of additional, fewer, and/or alternative steps may be employed that is suitable for accomplishing transmission of packets from a transmitting device at intervals calculated using packet transmission timing parameters, and/or for using a pseudorandom number generation algorithm in a receiving device to discover one or more packet transmission timing parameters based on the timing of multiple received advertisement packets and then using the discovered packet transmission timing parameters to synchronize the listening time/s of the receiving device with the packet transmission time/s of the transmitting device. For example, in one embodiment, an advertising device and scanning device may first establish a BLE connection and share predetermined advInterval value together with the pseudorandom number generation algorithm, before terminating the connection and initiating respective advertising and scanning modes where the seed value is the only packet transmission timing parameter to be discovered by the scanning device from T_advEvent of received advertisement packets. In another alternate exemplary embodiment, methodology 700 may return from step 712 to step 708 and repeat steps 708 to 712, updating the target packet transmission timing parameters as needed (e.g., updating seed value) and recalculating T_advEvent for each subsequent advertisement packet 250.

It will also be understood that one or more of the tasks, functions, or methodologies described herein for a radio module or radio device (e.g., including those described herein for module segment 110 and module segment 120 including link layer engine 125 of FIG. 1, etc.) may be implemented using one or more electronic circuits (e.g., central processing units (CPUs), controllers, microcontrollers, microprocessors, hardware accelerators, FPGAs (field programmable gate arrays), ASICs (application specific integrated circuits), and/or other programmable processing circuitry) that are programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For example, one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processor such as CPU, controller, microcontroller, microprocessor, ASIC or executed on a programmable logic device "PLD" such as FPGA, complex programmable logic device "CPLD", etc.) to perform one or more steps of the methodologies disclosed herein. In one embodiment, a group of such processors and PLDs may be processing devices selected from the group consisting of CPU, controller, microcontroller, microprocessor, FPGA, CPLD and ASIC. The computer program of instructions may include an ordered listing of executable instructions for implementing logical functions in the radio module. The executable instructions may include a plurality of code segments operable to instruct components of the radio module to perform the methodology disclosed herein. It will also be understood that one or more steps of the present methodologies may be employed in one or more code segments of the computer program. For example, a code segment executed by the information handling system may include one or more steps of the disclosed methodologies.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed circuits and methods may be utilized in various combinations and/or independently. Thus the invention is not limited to only those combinations shown herein, but rather may include other combinations.

What is claimed is:

1. A method of operating a radio apparatus, comprising:
wirelessly receiving multiple transmitted packets in the radio apparatus, each of the multiple packets being received at a time interval from a previous received packet that is based at least in part on a pseudorandom number generated from one or more packet transmission timing parameters;
measuring one or more of the time intervals, each of the time intervals being measured between receipt of a pair of the multiple received packets;
using the measured time intervals to discover one or more of the packet transmission timing parameters;
calculating a pseudorandom number using the discovered packet transmission timing parameters and using the calculated pseudorandom number to determine a listening time for a future transmitted packet; and
listening for a future transmitted packet at the determined listening time.

2. The method of claim 1, further comprising operating one or more receive path components of the radio apparatus in a relatively lower power consumption mode prior to the determined listening time; and then operating the one or more receive path components of the radio apparatus in a relatively higher power consumption mode during the determined listening time to receive the future transmitted packet.

3. The method of claim 1, further comprising calculating multiple pseudorandom numbers using the discovered packet transmission timing parameters; using the multiple calculated pseudorandom numbers to determine multiple intermittent listening times for receiving respective future transmitted packets; operating one or more receive path components of the radio apparatus in a relatively lower power consumption mode between each pair of determined listening times; and operating the one or more receive path components of the radio apparatus in a relatively higher power consumption mode to receive a transmitted packet during each of the determined listening times.

4. The method of claim 1, where the packet transmission timing parameters comprise a pseudorandom number generation seed value; and where the method further comprises calculating the pseudorandom number using the discovered seed value.

5. The method of claim 1, further comprising operating the radio apparatus as a Bluetooth Low Energy (BLE) scanning device; and where each of the transmitted packets is a BLE advertisement packet.

6. The method of claim 5, where the packet transmission timing parameters comprise a pseudorandom number generation seed value; and where the method further comprises calculating the pseudorandom number using the discovered seed value.

7. The method of claim 5, where each of the time intervals between the transmitted advertisement packets is a BLE advertisement event time interval (T_advEvent) that is the sum of a fixed regular time interval value (advInterval) and a defined number of multiple pseudorandom delay time values (advDelay), with one of the defined number of multiple pseudorandom delay time values (advDelay) having a value of zero; where the transmission timing parameters comprise at least the fixed regular time interval value (advInterval); and where the method further comprises measuring a number of time intervals (T_advEvent) corresponding to the defined number of multiple pseudorandom delay time values (advDelay); and determining the fixed regular time interval value (advInterval) to be equal to the minimum value of measured time interval (T_advEvent) that occurs when the pseudorandom delay time value (advDelay) has a value of zero.

8. The method of claim 7, where the packet transmission timing parameters further comprises a pseudorandom number generation seed value; and where the method further comprises using a pseudorandom number generation algorithm together with the multiple measured time intervals (T_advEvent) to calculate the pseudorandom number generation seed value, the pseudorandom number generation algorithm being the same pseudorandom number generation algorithm used to determine a transmission time from an external device for each of the received advertisement packets.

9. The method of claim 1, further comprising calculating a first pseudorandom number using the discovered packet transmission timing parameters and using the calculated first pseudorandom number to determine a first listening time for a future transmitted packet; and calculating at least a second pseudorandom number using the discovered packet transmission timing parameters and the calculated first pseudorandom number and using the calculated second pseudorandom number to determine a second listening time for a second future transmitted packet.

10. An apparatus, comprising at least one at least one processor or programmable logic device (PLD) coupled to memory and configured to be coupled to an antenna, the processor or PLD being programmed to:
- wirelessly receive multiple transmitted packets, each of the multiple packets being received at a time interval from a previous received packet that is based at least in part on a pseudorandom number generated from one or more packet transmission timing parameters;
- measure one or more of the time intervals, each of the time intervals being measured between receipt of a pair of the multiple received packets;
- use the measured time intervals to discover one or more of the packet transmission timing parameters;
- calculate a pseudorandom number using the discovered packet transmission timing parameters and using the calculated pseudorandom number to determine a listening time for a future transmitted packet; and
- listen for a future transmitted packet at the determined listening time.

11. The apparatus of claim 10, further comprising one or more receive path components configured to be coupled to the antenna; and where the processor or PLD is further programmed to operate the one or more receive path components in a relatively lower power consumption mode prior to the determined listening time, and then operate the one or more receive path components in a relatively higher power consumption mode during the determined listening time to receive the future transmitted packet.

12. The apparatus of claim 10, further comprising one or more receive path components configured to be coupled to the antenna; and where the processor or PLD is further programmed to:
- calculate multiple pseudorandom numbers using the discovered packet transmission timing parameters; using the multiple calculated pseudorandom numbers to determine multiple intermittent listening times for receiving respective future transmitted packets;
- operate the one or more receive path components in a relatively lower power consumption mode between each pair of determined listening times; and
- operate the one or more receive path components in a relatively higher power consumption mode to receive a transmitted packet during each of the determined listening times.

13. The apparatus of claim 10, where the packet transmission timing parameters comprise a pseudorandom number generation seed value; and where processor or PLD is further programmed to calculate the pseudorandom number using the discovered seed value.

14. The apparatus of claim 10, where the processor or PLD is further programmed to operate the apparatus as a Bluetooth Low Energy (BLE) scanning device; and where each of the transmitted packets is a BLE advertisement packet.

15. The apparatus of claim 14, where the packet transmission timing parameters comprise a pseudorandom number generation seed value; and where the processor or PLD is further programmed to calculate the pseudorandom number using the discovered seed value.

16. The apparatus of claim 14, where each of the time intervals between the transmitted advertisement packets is a BLE advertisement event time interval (T_advEvent) that is the sum of a fixed regular time interval value (advInterval) and a defined number of multiple pseudorandom delay time values (advDelay), with one of the defined number of multiple pseudorandom delay time values (advDelay) having a value of zero; where the transmission timing parameters comprise at least the fixed regular time interval value (advInterval); and where the processor or PLD is further programmed to measure a number of time intervals (T_advEvent) corresponding to the defined number of multiple pseudorandom delay time values (advDelay), and to determining the fixed regular time interval value (advInterval) to be equal to the minimum value of measured time interval (T_advEvent) that occurs when the pseudorandom delay time value (advDelay) has a value of zero.

17. The apparatus of claim 16, where the packet transmission timing parameters further comprises a pseudorandom number generation seed value; and where the processor or PLD is further programmed to use a pseudorandom number generation algorithm together with the multiple measured time intervals (T_advEvent) to calculate the pseudorandom number generation seed value, the pseudorandom number generation algorithm being the same pseudorandom number generation algorithm used to determine a transmission time from an external device for each of the received advertisement packets.

18. The apparatus of claim 10, where the processor or PLD is further programmed to calculate a first pseudorandom number using the discovered packet transmission timing parameters and to use the calculated first pseudorandom number to determine a first listening time for a future transmitted packet; and to calculate at least a second pseudorandom number using the discovered packet transmission timing parameters and the calculated first pseudorandom number and to use the calculated second pseudorandom number to determine a second listening time for a second future transmitted packet.

19. A method, comprising:
- wirelessly transmitting multiple transmitted packets from a first radio apparatus, each of the multiple packets being transmitted at a time interval from a previous transmitted packet that is based at least in part on a pseudorandom number generated from one or more packet transmission timing parameters;
- wirelessly receiving the multiple transmitted packets in a second radio apparatus;
- measuring one or more of the time intervals in the second radio apparatus, each of the time intervals being measured between receipt of a pair of the multiple received packets;
- using the measured time intervals to discover one or more of the packet transmission timing parameters;
- calculating the pseudorandom number using the discovered packet transmission timing parameters and using the calculated pseudorandom number to determine a listening time for an additional transmitted packet;
- wirelessly transmitting the additional packet from the first radio apparatus; and
- listening for the additional transmitted packet in the second radio apparatus at the determined listening time.

20. The method of claim 19, further comprising operating the first radio apparatus as a Bluetooth Low Energy (BLE) advertising device and operating the second radio apparatus as a BLE scanning device; and where each of the transmitted packets is a BLE advertisement packet.

21. The method of claim 19, further comprising sharing at least one of the packet transmission timing parameters between the first radio apparatus and second radio apparatus prior to wirelessly transmitting the multiple transmitted packets from the first radio apparatus.

* * * * *